United States Patent
Nagayama

(10) Patent No.: US 9,399,169 B2
(45) Date of Patent: Jul. 26, 2016

(54) GAME SYSTEM, CONTROL METHOD FOR GAME SYSTEM, OUTPUT DEVICE, CONTROL METHOD FOR OUTPUT DEVICE, AND INFORMATION STORAGE MEDIUM

(75) Inventor: Kentaro Nagayama, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 953 days.

(21) Appl. No.: 12/581,610

(22) Filed: Oct. 19, 2009

(65) Prior Publication Data

US 2010/0099497 A1 Apr. 22, 2010

(30) Foreign Application Priority Data

Oct. 22, 2008 (JP) .................. 2008-271651

(51) Int. Cl.
*A63F 13/30* (2014.01)

(52) U.S. Cl.
CPC ........... *A63F 13/12* (2013.01); *A63F 2300/534* (2013.01)

(58) Field of Classification Search
CPC ......................... A63F 13/12; A63F 2300/534
USPC ............................... 463/1, 4, 7, 30
See application file for complete search history.

(56) References Cited

U.S. PATENT DOCUMENTS

| 6,682,425 | B2 * | 1/2004 | Nakayama | 463/35 |
| 6,722,988 | B2 * | 4/2004 | Yamaguchi | 463/35 |
| 6,999,083 | B2 * | 2/2006 | Wong et al. | 345/473 |
| 2002/0132667 | A1 * | 9/2002 | Shoji | 463/43 |
| 2003/0038805 | A1 | 2/2003 | Wong et al. | |
| 2003/0139209 | A1 * | 7/2003 | Nakayama | 463/6 |
| 2007/0117635 | A1 * | 5/2007 | Spanton et al. | 463/43 |
| 2008/0015003 | A1 * | 1/2008 | Walker et al. | 463/1 |
| 2009/0270182 | A1 | 10/2009 | Kudo | |

FOREIGN PATENT DOCUMENTS

| JP | 2003-164672 A | 6/2003 |
| JP | 2005192878 A | 7/2005 |
| JP | 2005205099 A | 8/2005 |
| WO | 2007032171 A1 | 3/2007 |

OTHER PUBLICATIONS

Japanese Office Action corresponding to Japanese Patent Application No. 2008-271651, dated Oct. 15, 2010.

* cited by examiner

*Primary Examiner* — Jasson Yoo

(74) *Attorney, Agent, or Firm* — Sughrue Mion, PLLC

(57) ABSTRACT

Provided is a game system that, while reducing a load on a communication line, enables a current situation of a game that is being played by at least one user to be known by another user. A situation identifying information transmission section transmits, to an output device, situation identifying information related to the situation of the game that is being executed in at least one game device. An output control section of the output device causes an output section to output the situation of the game based on the situation identifying information.

18 Claims, 9 Drawing Sheets

FIG.9

| LINE ID | LINE DATA | OUTPUT CONDITION |
|---|---|---|
| ... | ... | ... |
| 100 | "THE PLAYER IS DRIBBLING FORWARD NEAR THE SIDELINE!" | PLAYER IS DRIBBLING FORWARD NEAR SIDELINE. |
| ... | ... | ... |
| 110 | "CROSS!" | CROSS HAS BEEN PERFORMED. |
| ... | ... | ... |
| 120 | "HEADER!" | HEADER HAS BEEN PERFORMED. |
| ... | ... | ... |

FIG.10

| IMAGE ID | IMAGE DATA | REFERENCE COMBINATION |
|---|---|---|
| ... | ... | ... |
| 0010 | ----- | 100, 110, 120 |
| ... | ... | ... |

| IMAGE ID | IMAGE DATA | REFERENCE COMBINATION | PARAMETER CONDITION |
|---|---|---|---|
| ... | ... | ... | ... |
| 0010 | ------ | 100, 110, 120 | VALUE OF HEADER PARAMETER IS SMALLER THAN REFERENCE VALUE |
| 0011 | ------ | 100, 110, 120 | VALUE OF HEADER PARAMETER IS EQUAL TO OR LARGER THAN REFERENCE VALUE |
| ... | ... | ... | ... |

GAME SYSTEM, CONTROL METHOD FOR GAME SYSTEM, OUTPUT DEVICE, CONTROL METHOD FOR OUTPUT DEVICE, AND INFORMATION STORAGE MEDIUM

CROSS-REFERENCE TO RELATED APPLICATION

The present application claims priority from Japanese application JP 2008-271651 filed on Oct. 22, 2008, the content of which is hereby incorporated by reference into this application.

BACKGROUND OF THE INVENTION

1. Field of the Invention

The present invention relates to a game system, a control method for a game system, an output device, a control method for an output device, and an information storage medium.

2. Description of the Related Art

There is known a game system that, by distributing a current situation of a game that is being played by at least one user to another user (user other than a user who is playing that game), enables the another user to know the situation of the game that is being played by the at least one user. For example, there is known a game system that, by distributing a current situation of a competitive game (for example, sports game, racing game, or fighting game) that is being played among a plurality of users to another user, enables the other user to know the situation of the competitive game (see JP 2003-164672 A).

SUMMARY OF THE INVENTION

In the above-mentioned game system, there is a case in which it is desired that the current situation of the game be distributed to a large number of users. For example, in a case of a tournament of a competitive sports game, there is a case in which it is desired that the current situation of a final or semifinal match be distributed to a large number of users to make it possible for the large number of users to know the situation of the final or semifinal match in real time. In such a case, it is necessary to reduce a load on a communication line.

The present invention has been made in view of the above-mentioned problem, and has an object to provide a game system, a control method for a game system, an output device, a control method for an output device, and an information storage medium, which enable a current situation of a game that is being played by at least one user to be known by other users (users other than a user who is playing that game), while reducing a load on a communication line.

In order to solve the above-mentioned problem, according to the present invention, there is provided a game system including: at least one game device; an output device; and a situation identifying information transmission section for transmitting, to the output device, situation identifying information related to a situation of a game that is executed in the at least one game device, in which the output device includes an output control section for causing an output section to output the situation of the game based on the situation identifying information.

Further, according to the present invention, there is provided a control method for a game system, the game system including: at least one game device; and an output device, the control method including: a situation identifying information transmission step of transmitting, to the output device, situation identifying information related to a situation of a game that is executed in the at least one game device; and an output control step of causing the output device to output the situation of the game based on the situation identifying information.

Further, according to the present invention, there is provided an output device including: a situation identifying information reception section for receiving situation identifying information related to a situation of a game that is executed in at least one game device; and an output control section for causing an output section to output the situation of the game based on the situation identifying information.

Further, according to the present invention, there is provided a control method for an output device, including: a situation identifying information reception step of receiving situation identifying information related to a situation of a game that is executed in at least one game device; and an output control step of causing an output section to output the situation of the game based on the situation identifying information.

Further, according to the present invention, there is provided a program for causing a computer such as a home-use game machine, a portable game machine, a cellular phone, a personal digital assistant (PDA), or a personal computer to function as: a situation identifying information reception section for receiving situation identifying information related to a situation of a game that is executed in at least one game device; and an output control section for causing an output section to output the situation of the game based on the situation identifying information.

Further, an information storage medium according to the present invention is a computer-readable information storage medium recorded with the above-mentioned program.

The present invention enables a current situation of a game that is being played by at least one user to be known by another user, while reducing a load on a communication line.

In one aspect of the present invention, the situation identifying information transmission section may transmit, as the situation identifying information, identification information of one of character string data and sound data, the character string data and the sound data indicating the situation of the game. The output control section may include a section for causing the output section to output the one of the character string data and the sound data, which corresponds to the identification information received as the situation identifying information.

In one aspect of the present invention, the output device may include: an output data storage section for storing output data in association with a reference combination of the situation identifying information; and a judgment section for judging whether or not a combination of the received situation identifying information contains the reference combination. If the combination of the received situation identifying information contains the reference combination, the output control section may cause the output section to output the output data associated with the reference combination.

In one aspect of the present invention, if a game character has performed an action in the game, the situation identifying information transmission section may transmit, as the situation identifying information, first identification information corresponding to the action to the output device, and also transmit second identification information corresponding to the game character to the output device. The output data storage section may store the output data in association with a reference combination of the first identification information and a parameter condition regarding a parameter of the game character. The judgment section may judge whether or not a combination of the received first identification information contains the reference combination. If the combination of the received first identification information contains the reference combination, the output control section may cause the output section to output the output data associated with the reference combination and the parameter condition that is satisfied by the parameter of the game character corresponding to the received second identification information.

In one aspect of the present invention, if a game event has occurred in the game, the situation identifying information transmission section may transmit, as the situation identifying information, first identification information corresponding to the game event to the output device, and also transmit second identification information corresponding to a game character that has caused the game event to occur to the output device. The output data storage section may store the output data in association with a reference combination of the first identification information and a parameter condition regarding a parameter of the game character. The judgment section may judge whether or not a combination of the received first identification information contains the reference combination. If the combination of the received first identification information contains the reference combination, the output control section may cause the output section to output the output data associated with the reference combination and the parameter condition that is satisfied by the parameter of the game character corresponding to the received second identification information.

In one aspect of the present invention, the situation identifying information transmission section may include a section for acquiring a selection result obtained in the case where a user corresponding to the output device has selected one of at least one game character and at least one game character group, and transmit, to the output device, the situation identifying information related to a situation of the one of the at least one game character and the at least one game character group, which has been selected by the user corresponding to the output device.

BRIEF DESCRIPTION OF THE DRAWINGS

In the accompanying drawings:

FIG. 9 is a diagram illustrating an example of a line table;

FIG. 10 is a diagram illustrating an example of an image table;

DETAILED DESCRIPTION OF THE INVENTION

Hereinbelow, detailed description is given of an example of an embodiment of the present invention with reference to the drawings.

[1. Configuration of Game System]

Figure 1:
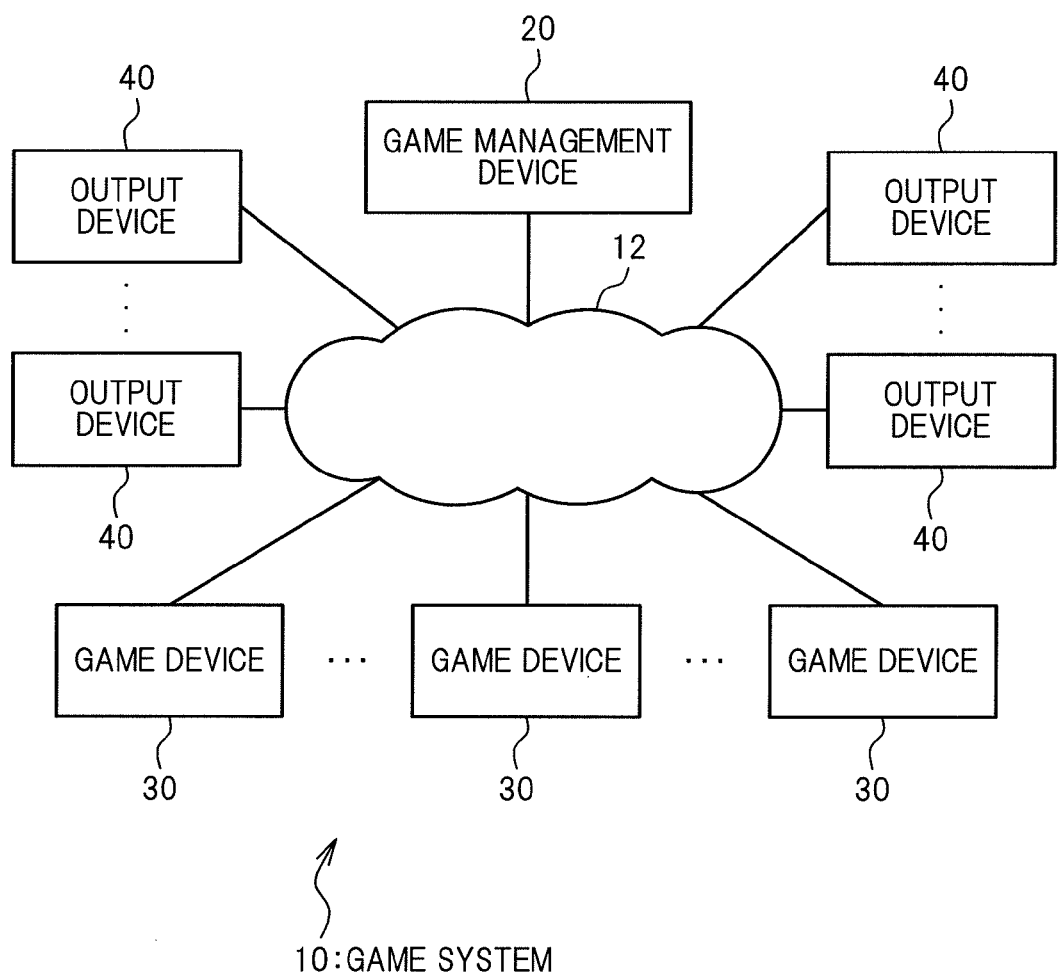
FIG. 1 is a diagram illustrating an overall configuration of a game system according to an embodiment of the present invention.

FIG. 1 is a diagram illustrating an overall configuration of a game system according to the embodiment of the present invention. As illustrated in FIG. 1, a game system 10 according to the embodiment includes a game management device 20, a plurality of game devices 30, and a plurality of output devices 40. The game management device 20, the plurality of game devices 30, and the plurality of output devices 40 are connected to a communication network 12 including, for example, the Internet. The game management device 20 and the game device 30 are capable of data communications between each other, and also, one game device 30 is capable of data communications with another game device 30. Further, the game management device 20 and the output device 40 are capable of data communications between each other, and the game device 30 and the output device 40 are also capable of data communications between each other.

Figure 2:
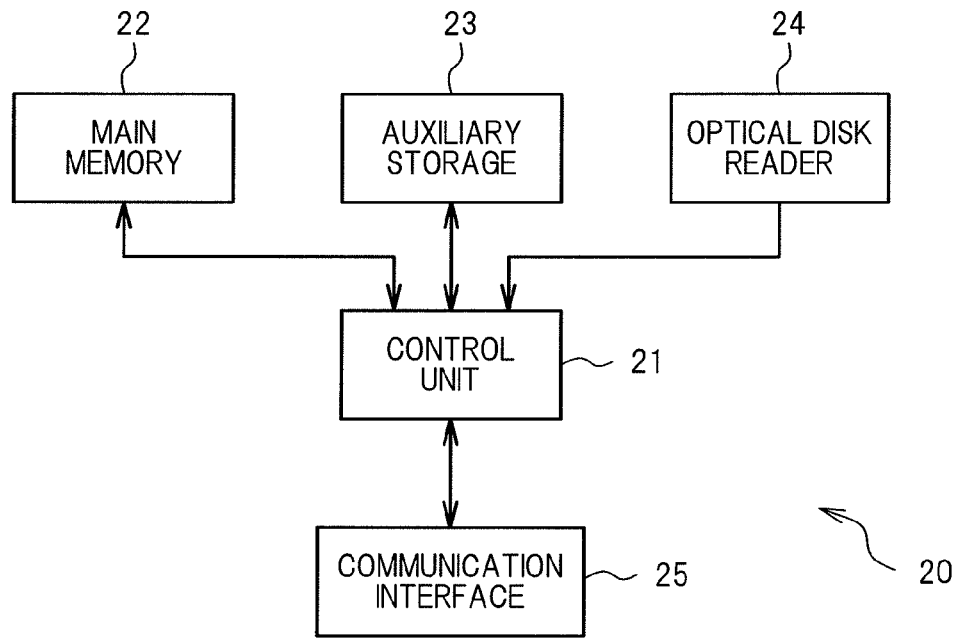
FIG. 2 is a diagram illustrating a hardware configuration of a game management device.

The game management device 20 is implemented by a well-known server computer system. The game management device 20 serves for managing the plurality of game devices 30 and the plurality of output devices 40 included in the game system 10. FIG. 2 is a diagram illustrating a hardware configuration of the game management device 20. As illustrated in FIG. 2, the game management device 20 includes a control unit 21, a main memory 22, an auxiliary storage 23, an optical disk reader 24, and a communication interface 25.

The control unit 21 is, for example, a central processing unit (CPU), and executes various kinds of information processing in accordance with an operating system or another program, which has been loaded into the main memory 22. The main memory 22 includes, for example, a random access memory (RAM). The main memory 22 stores a program or data, which has been read out from the auxiliary storage 23 or an optical disk (information storage medium). In addition, the main memory 22 is also used as a working memory for storing data necessary in the course of processing. The auxiliary storage 23 includes, for example, a hard disk unit. The optical disk reader 24 reads out a program or data stored on an optical disk. The communication interface 25 is an interface for connecting the game management device 20 to the communication network 12.

Figure 3:
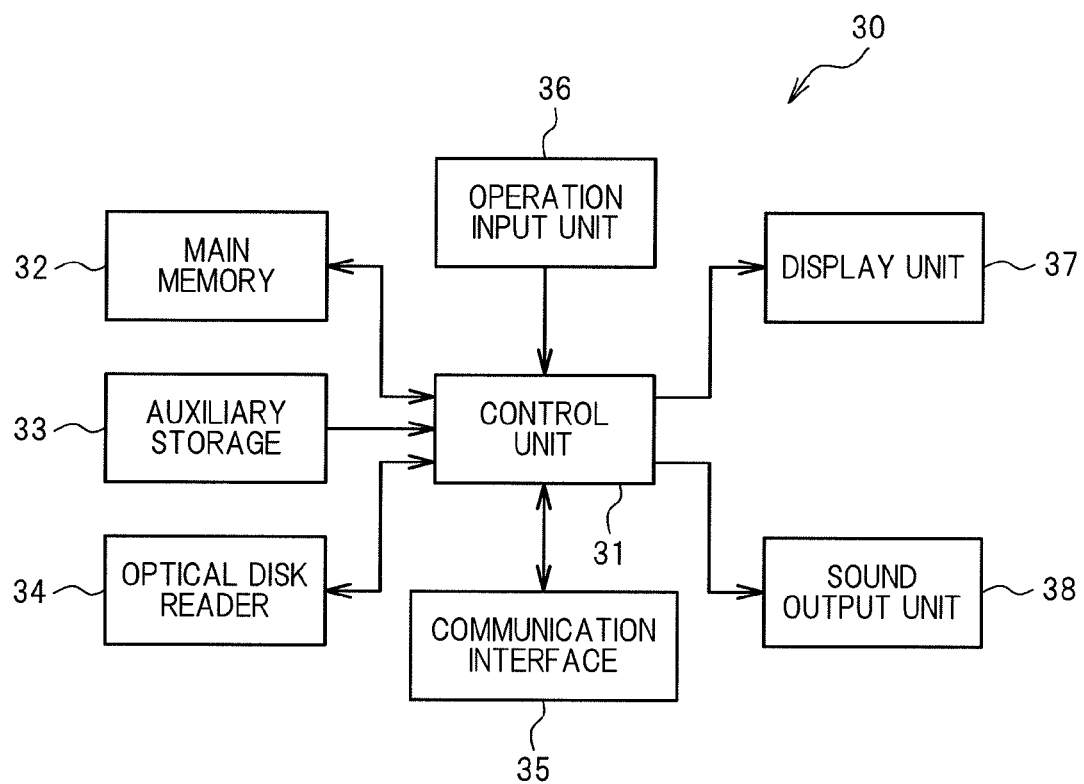
FIG. 3 is a diagram illustrating a hardware configuration of a game device.

The game device 30 is implemented by, for example, a home-use game machine (stationary game machine), a portable game machine, a cellular phone, a personal digital assistant (PDA), or a personal computer. FIG. 3 is a diagram illustrating a hardware configuration of the game device 30. As illustrated in FIG. 3, the game device 30 includes a control unit 31, a main memory 32, an auxiliary storage 33, an optical disk reader 34, a communication interface 35, an operation input unit 36, a display unit 37, and a sound output unit 38.

The control unit 31 includes, for example, a CPU, a graphics processing unit (GPU), and a sound processing unit (SPU), and executes various kinds of information processing in accordance with an operating system or another program, which has been loaded into the main memory 32. The main memory 32 includes, for example, a RAM. The main memory 32 stores a program or data, which has been read out from the auxiliary storage 33 or an optical disk. In addition, the main memory 32 is also used as a working memory for storing data necessary in the course of processing. The auxiliary storage 33 includes, for example, a memory card slot into which a memory card (information storage medium) is to be inserted, or a hard disk unit (information storage medium). The optical disk reader 34 reads out a program or data stored on an optical disk.

The communication interface 35 is an interface for communicably connecting the game device 30 to the communication network 12. The operation input unit 36 includes, for example, a game controller or a touch panel, and receives operation input from a user. The display unit 37 is, for example, a home-use television set or an LCD panel, and displays a screen in accordance with an instruction from the control unit 31. The sound output unit 38 includes, for example, a speaker or a headphone, and outputs, in accordance with an instruction from the control unit 31, various kinds of sound data including game music, game sound effects, and messages, which are read out from the auxiliary storage 33 or an optical disk.

Figure 4:
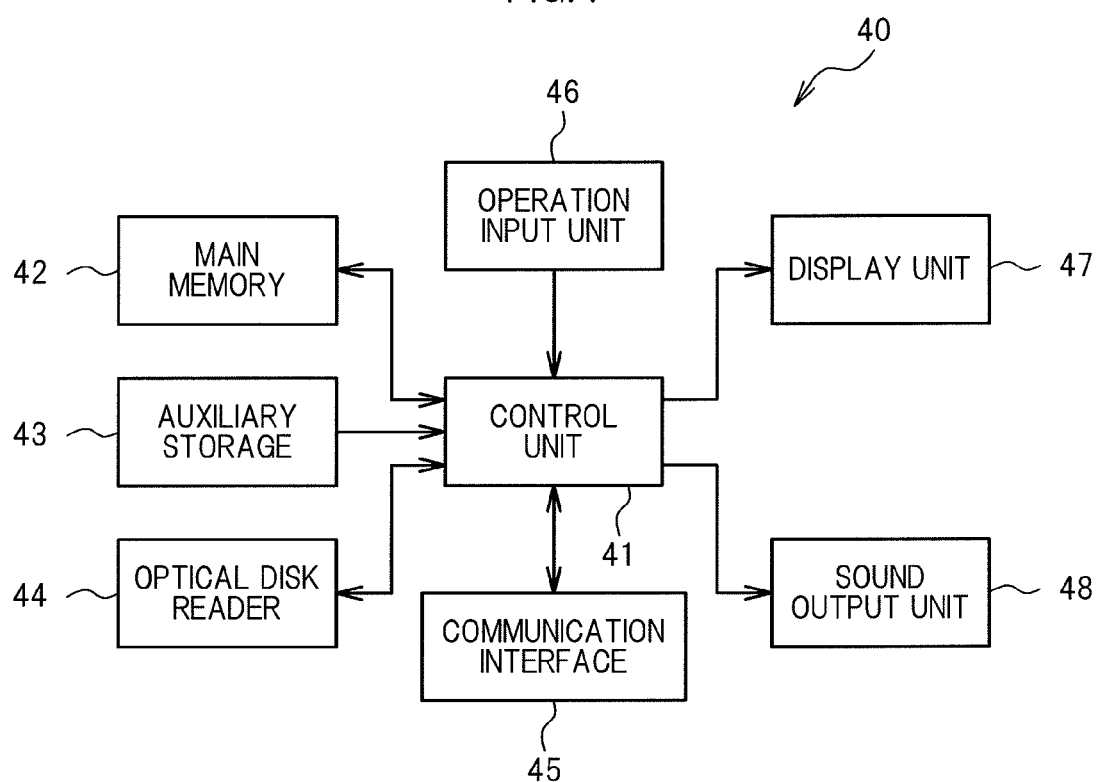
FIG. 4 is a diagram illustrating a hardware configuration of an output device.

The output device 40 is implemented by, for example, a home-use game machine (stationary game machine), a portable game machine, a cellular phone, a PDA, or a personal computer. FIG. 4 is a diagram illustrating a hardware configuration of the output device 40. As illustrated in FIG. 4, the output device 40 includes a control unit 41, a main memory 42, an auxiliary storage 43, an optical disk reader 44, a communication interface 45, an operation input unit 46, a display unit 47, and a sound output unit 48. Those components are respectively similar to the control unit 31, main memory 32, auxiliary storage 33, optical disk reader 34, communication interface 35, operation input unit 36, display unit 37, and sound output unit 38 of the game device 30, and hence description thereof is herein omitted.

The program or data is supplied to the game management device 20, the game device 30, or the output device 40 by means of an optical disk. Specifically, the program or data stored on the optical disk is read out by the game management device 20, the game device 30, or the output device 40, and is then stored in the game management device 20, the game device 30, or the output device 40. It should be noted that the program or data may be supplied to the game management device 20, the game device 30, or the output device 40 via the communication network 12 from a distant location.

[2. Game to be Executed in Game System]

In the game system 10, a network game in which users of the plurality of game devices 30 participate is executed. For example, a game in which a plurality of users compete against one another or a game where a plurality of users play in a cooperating manner is executed in the game system 10. Further, in the game system 10, a current situation of the game is distributed to the plurality of output devices 40 in real time. As a result, the users of the plurality of output devices 40 can know the situation of the game that is being played by other users, which therefore enables the users to feel like spectators.

Hereinbelow, description is given of a case of executing, in the game system 10, a competitive soccer game that is played between a team A operated by a user A of one game device 30 and a team B operated by a user B of another game device 30. Further, description is given of a case in which the current situation of the soccer game is distributed to the plurality of output devices 40. It should be noted that, hereinbelow, the game device 30 of the user A is referred to as a "game device A", and the game device 30 of the user B is referred to as a "game device B".

[3. Game Space]

Figure 5:
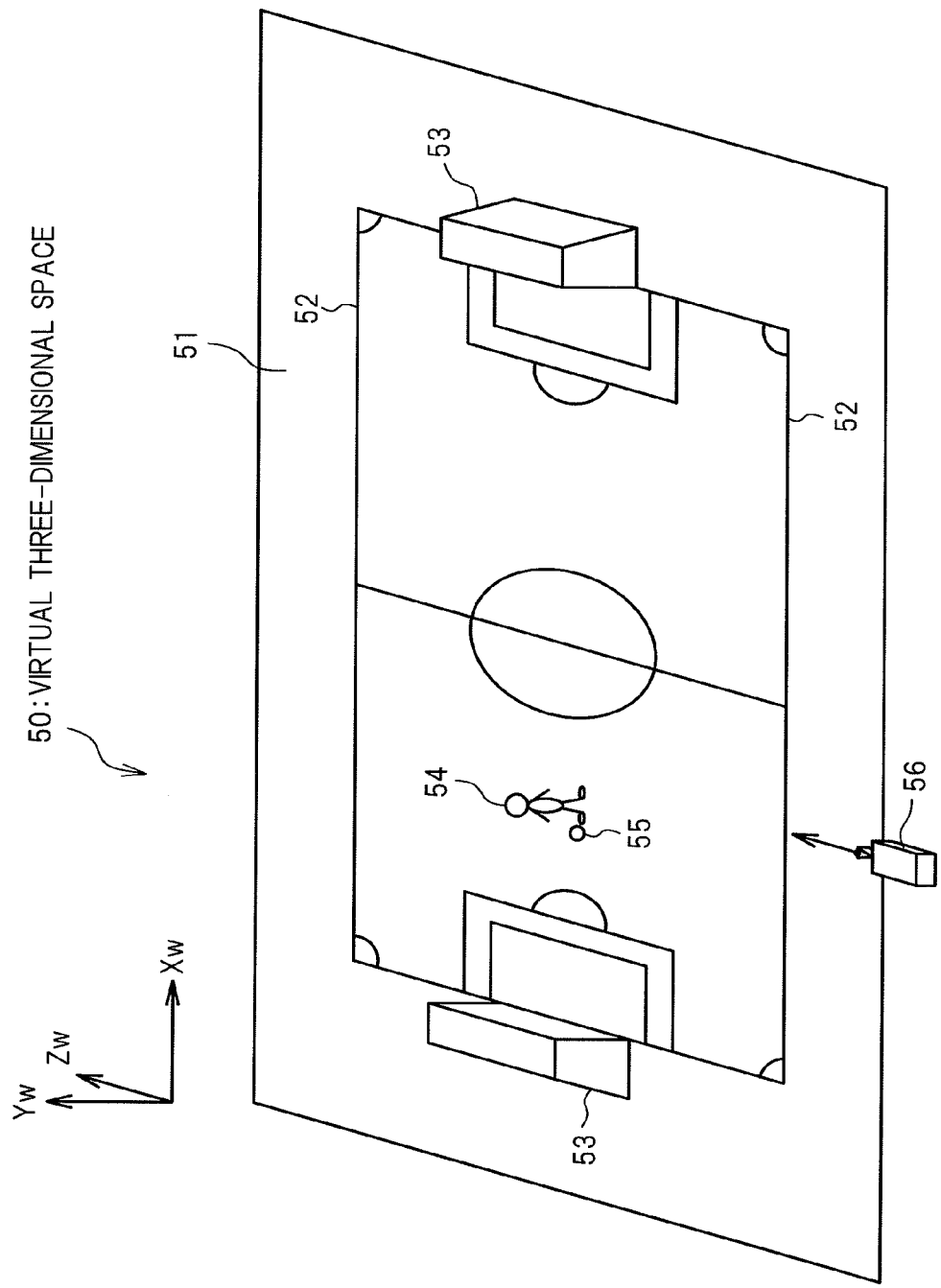
FIG. 5 is a diagram illustrating an example of a virtual three-dimensional space.

In order to implement a soccer game, a common game space is created in the main memories 32 of both the game devices A and B. FIG. 5 illustrates an example of the common game space. The game space illustrated in FIG. 5 is a virtual three-dimensional space 50 in which positions and the like are managed using three coordinate elements (Xw, Yw, and Zw). As illustrated in FIG. 5, a field 51 which is an object representing a soccer field is located in the virtual three-dimensional space 50. On the field 51, there are provided sidelines 52, for example. In addition, goals 53 which are objects representing goals, player characters 54 which are objects representing soccer players, and a ball 55 which is an object representing a soccer ball are located on the field 51.

Though omitted in FIG. 5, eleven player characters 54 belonging to the team A and eleven player characters 54 belonging to the team B are actually located in the virtual three-dimensional space 50. Any one of the eleven player characters 54 belonging to the team A is set as an operation target of the user A, and that player character 54 acts in accordance with an operation performed by the user A. Similarly, any one of the eleven player characters 54 belonging to the team B is set as the operation target of the user B, and that player character 54 acts in accordance with an operation performed by the user B. The player characters 54 that are not set as the operation targets of the users act in accordance with an operation performed by a computer.

The goals 53 are each associated with one of the teams. When the ball 55 has moved into the goal 53 associated with one of the teams, a scoring event occurs for the other one of the teams.

Here, description is given of an example of a method for making the game space common between the game devices A and B. In this embodiment, any one of the game devices A and B serves as a game server, thereby enabling the game space to be made common between those game devices 30. Here, the description is given assuming a case in which the game device A serves as the game server. In this case, game situation data indicating the latest game situation is stored in the main memory 32 of the game device A. Further, a replication of the game situation data is stored in the main memory 32 of the game device B.

The game situation data contains data indicating a current state of the virtual three-dimensional space 50, and data indicating a current situation of a match. For example, the game situation data contains the following data.

(1) data indicating a state (position, posture, moving speed, etc.) of each layer character 54
(2) data indicating a state (position, moving speed, etc.) of the ball 55
(3) data indicating a player character 54 that is keeping the ball 55
(4) data indicating player characters 54 that are being operated by the user A and the user B
(5) data indicating scores of the team A and the team B
(6) data indicating an elapsed time The game situation data stored in the game devices A and B is updated in the following manner. In the case in which the game device A serves as the game server, the game device B transmits, to the game device A, operation data indicating the content of an operation that has been performed by the user B. In this case, the game device A updates the game situation data stored in the game device A based on the content of an operation that has been performed by the user A and the operation data (content of the operation that has been performed by the user B) received from the game device B. Further, the game device A transmits, to the game device B, update data for reporting an updated content of the game situation data to the game device B. The game device B updates the game situation data stored in the game device B based on the update data that has been received from the game device A.

[4. Game Screen]

A virtual camera 56 is set in the virtual three-dimensional space 50. The display unit 37 of each of the game devices A and B displays a game screen showing a state of the virtual three-dimensional space 50 viewed from the virtual camera 56. For example, the position and the line of sight of the virtual camera 56 are controlled based on the position of the ball 55 so that the ball 55 is displayed in the game screen. In the game device A, the game screen showing the state of the virtual three-dimensional space 50 viewed from the virtual camera 56 is generated based on the game situation data stored in the game device A, and then the game screen is displayed in the display unit 37. Similarly, in the game device B, the game screen showing the state of the virtual three-dimensional space 50 viewed from the virtual camera 56 is generated based on the game situation data stored in the game device B, and then the game screen is displayed in the display unit 37.

Figure 6:
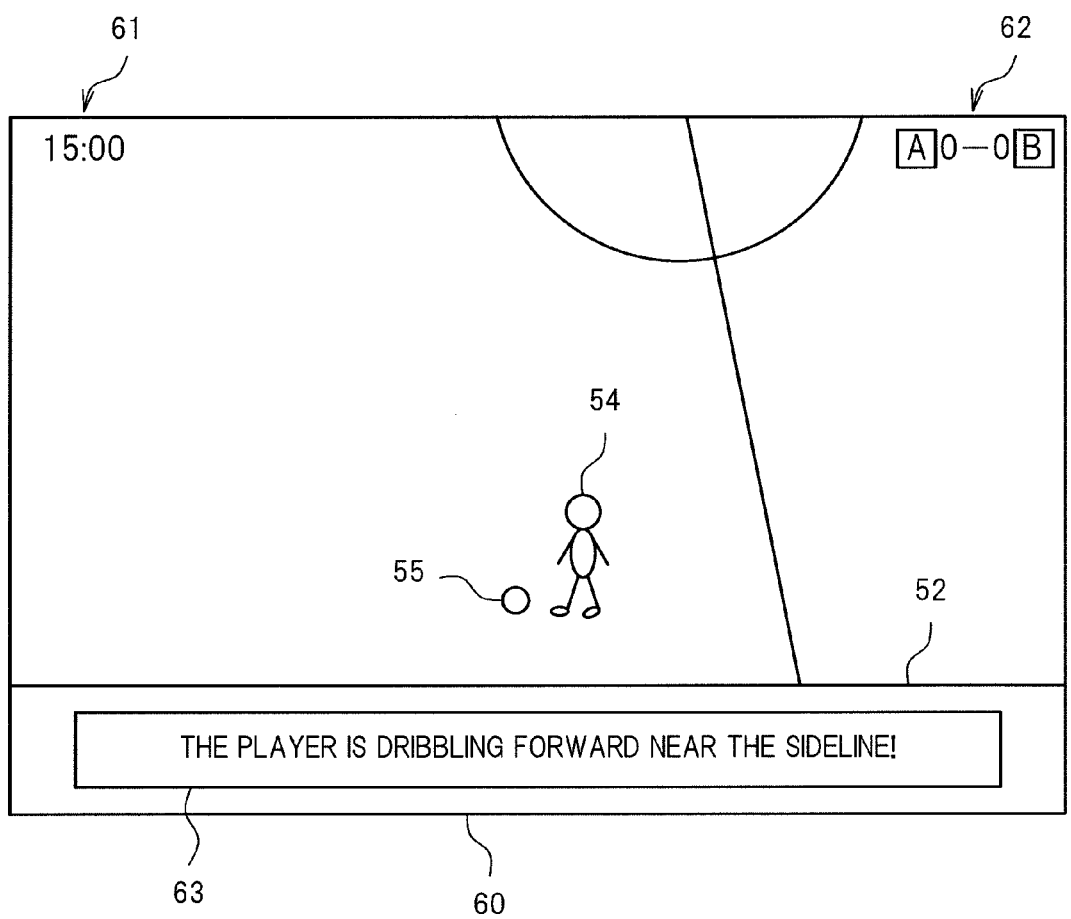
FIG. 6 is a diagram illustrating an example of a game screen.

FIG. 6 illustrates an example of the game screen. As illustrated in FIG. 6, on a game screen 60, an image showing the state of the virtual three-dimensional space 50 viewed from the virtual camera 56 is displayed. In addition, an elapsed time 61 and scores 62 are displayed on the game screen 60. Further, on the game screen 60, a line (speech) 63 by an announcer reporting a current situation of the game (match) is displayed. For example, on the game screen 60 illustrated in FIG. 6, the player character 54 is dribbling near the sideline 52, and the line 63 that reads "The player is dribbling forward near the sideline!" is displayed. Further, for example, in the case where the player character 54 has performed a pass (cross) to a teammate player character 54 positioned in front of the goal 53 of the opponent team, the line 63 that reads "Cross!" is displayed. Further, for example, in the case where the player character 54 has performed a header, the line 63 that reads "Header!" is displayed. It should be noted that lines are also output from the sound output unit 38 as sound.

[5. Watching Screen]

Figure 7:
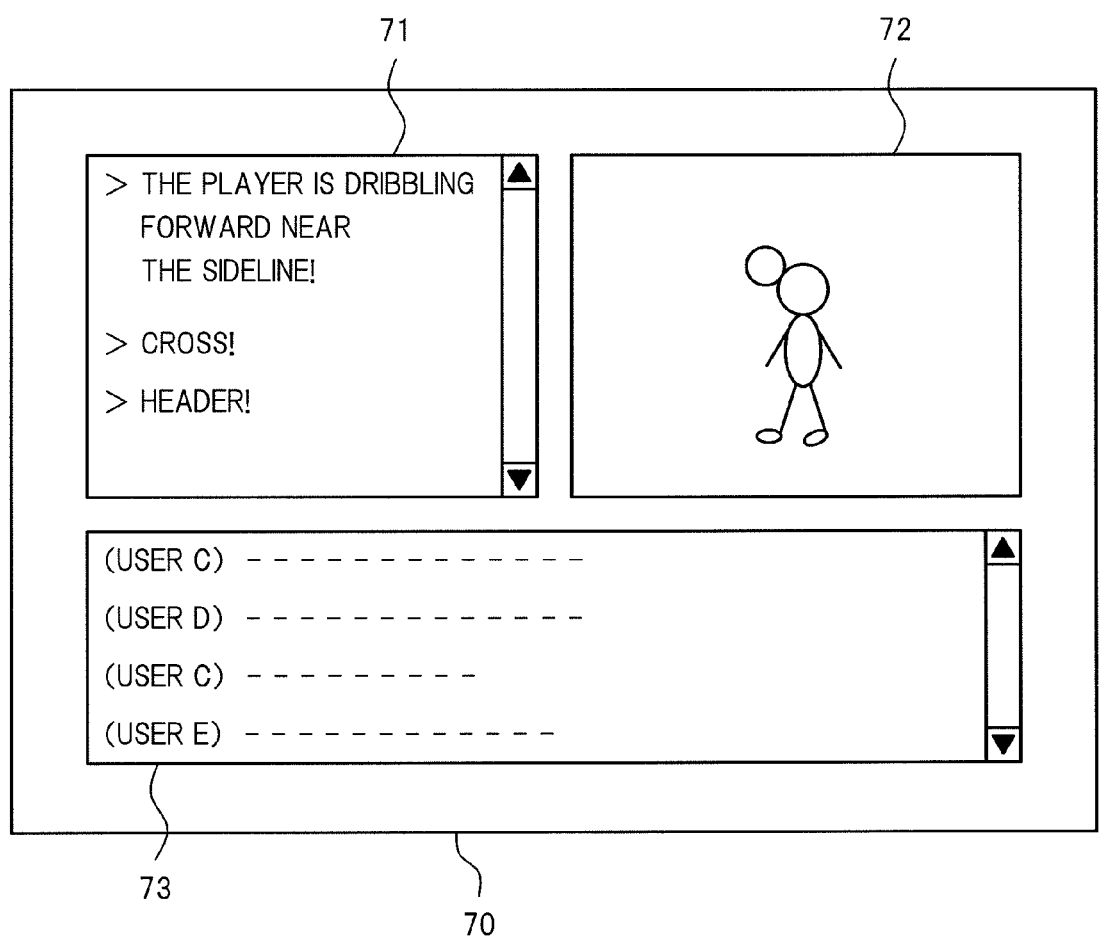
FIG. 7 is a diagram illustrating an example of a watching screen.

FIG. 7 illustrates an example of a screen (hereinbelow, referred to as "watching screen") displayed in the output device 40. As illustrated in FIG. 7, a watching screen 70 includes an actual scene section 71, an image section 72, and a chat section 73. The actual scene section 71 is a section for displaying words about an actual scene of a soccer game that is being executed in the game devices A and B. The image section 72 is a section for displaying an image (still image or moving image) showing a situation of the soccer game that is being executed in the game devices A and B. The chat section 73 is a section for displaying the contents of chat exchanged between the users of other output devices 40. By viewing the watching screen 70, the user of the output device 40 can know the current situation of the soccer game that is being executed in the game devices A and B, and thus can feel as if they are watching the soccer game as a spectator.

[6. Functional Blocks]

Figure 8:
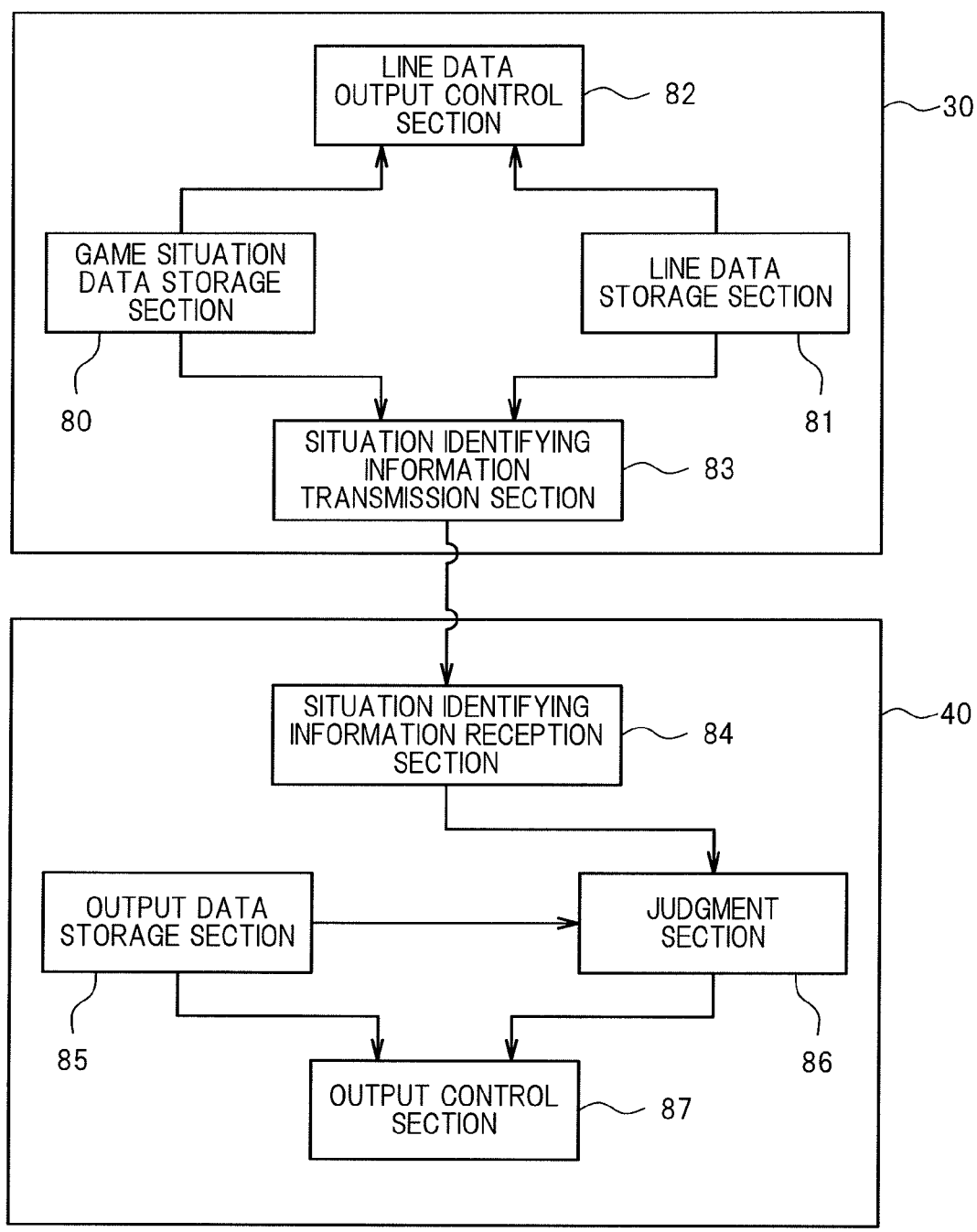
FIG. 8 is a functional block diagram of the game system according to the embodiment.

FIG. 8 is a functional block diagram mainly illustrating, of the functions implemented in the game system 10, functions related to the present invention. As illustrated in FIG. 8, the game system 10 includes a game situation data storage section 80, a line data storage section 81, a line data output control section 82, a situation identifying information transmission section 83, a situation identifying information reception section 84, an output data storage section 85, a judgment section 86, and an output control section 87.

For example, the game situation data storage section 80, the line data storage section 81, and the line data output control section 82 are implemented by each of the game devices A and B. The game situation data storage section 80 is implemented by, for example, the main memory 32, whereas the line data storage section 81 is implemented by, for example, an optical disk inserted into the optical disk reader 34, or the auxiliary storage 33. The line data output control section 82 is implemented by, for example, the control unit 31 executing the program.

Further, for example, the situation identifying information transmission section 83 is implemented by at least one of the game devices 30. For example, the situation identifying information transmission section 83 is implemented by the game device A serving as the game server. The situation identifying information transmission section 83 is implemented by, for example, the control unit 31 executing the program.

Further, for example, the situation identifying information reception section 84, the output data storage section 85, the judgment section 86, and the output control section 87 are implemented by the output device 40. The output data storage section 85 is implemented by, for example, an optical disk inserted into the optical disk reader 44, or the auxiliary storage 43. The situation identifying information reception section 84, the judgment section 86, and the output control section 87 are implemented by, for example, the control unit 41 executing the program.

[6-1. Game Situation Data Storage Section]

The game situation data storage section 80 stores the game situation data. As described above, the game situation data is data indicating the current situation of a game.

[6-2. Line Data Storage Section]

The line data storage section 81 stores the line data. For example, the line data is data of an announcer's line (speech) reporting the current situation of a soccer game. The line data contains character string data for displaying an announcer's line in the display unit 37, and sound data for outputting the announcer's line from the sound output unit 38.

Further, the line data storage section 81 stores a line table for controlling output of the line data. FIG. 9 illustrates an example of the line table. As illustrated in FIG. 9, the line table contains "line ID", "line data", and "output condition" fields. The "line ID" indicates identification information for uniquely identifying the line data. The "output condition" indicates a condition (output condition) that should be satisfied for particular line data to be output. For example, the output condition includes a condition as to whether or not the player character 54 has performed a predetermined action. The "predetermined action" includes actions that involve, for example, the ball 55. Specifically, the "predetermined action" includes a dribbling action, a pass action, a cross action, a shooting action, and the like. Moreover, for example, the output condition includes a condition as to whether or not a predetermined game event has occurred. The "game event" includes, for example, a game event corresponding to an action itself performed by the player character 54, and a game event that occurs as the result of an action performed by the player character 54. Specifically, the "game event" includes a cross event, a shooting event, a scoring event, a foul event, and the like. Whether or not the above-mentioned output condition is satisfied is judged based on the game situation data. As described above, the line data storage section 81 stores the line data which is output in the case where the player character 54 has performed a predetermined action, and the line data which is output in the case where a predetermined game event has occurred.

[6-3. Line Data Output Control Section]

The line data output control section 82 causes the display unit 37 or the sound output unit 38 to output the line data. The line data output control section 82 causes the display unit 37 or the sound output unit 38 to output a piece of the line data that has been judged to satisfy the output condition. It should be noted that when the line data is output, a player's name or the like may be output.

[6-4. Situation Identifying Information Transmission Section]

The situation identifying information transmission section 83 transmits, to the output device 40, identification information (situation identifying information) regarding the situation of the game that is being executed in the game devices A and B. It should be noted that the situation identifying information transmission section 83 acquires, from the game management device 20, such information (for example, IP address, etc.) that is necessary for transmitting the situation identifying information to the output device 40.

For example, in the case where the player character 54 has performed a predetermined action, the situation identifying information transmission section 83 transmits, to the output device 40, identification information corresponding to the action as the situation identifying information. Here, in this case, the situation identifying information transmission section 83 also transmits, to the output device 40, identification information corresponding to the player character 54 that has performed the action. As described above, in this embodiment, in the case where the player character 54 has performed a predetermined action, the line data corresponding to the action is output. The situation identifying information transmission section 83 transmits the line ID of that line data to the output device 40 as the identification information corresponding to the action. In addition, a player ID is transmitted to the output device 40 as the identification information corresponding to the player character 54.

Further, for example, in the case where a predetermined game event has occurred, the situation identifying information transmission section 83 transmits, to the output device 40, the identification information corresponding to the game event as the situation identifying information. Here, in the case where a player character 54 has caused the game event to occur, the situation identifying information transmission section 83 also transmits, to the output device 40, the identification information corresponding to the player character 54 that has caused the game event to occur. As described above, in this embodiment, in the case where a predetermined game event has occurred, the line data corresponding to the game event is output. The situation identifying information transmission section 83 transmits the line ID of that line data to the output device 40 as the identification information corresponding to the game event.

[6-5. Situation Identifying Information Reception Section]

The situation identifying information reception section 84 receives the situation identifying information. In this embodiment, the situation identifying information reception section 84 receives the line ID and the player ID, and then the received line ID and player ID are stored in the main memory 42.

[6-6. Output Data Storage Section]

The output data storage section 85 stores data (output data) that is to be output from the display unit 47 or the sound output unit 48. For example, the output data storage section 85 stores the same data as the line data and line table stored in the line data storage section 81.

Further, for example, the output data storage section 85 stores image data in association with a reference combination of the situation identifying information. The image data may be still image data or may be moving image data. In this embodiment, image data that shows typical scenes of a soccer game is stored. For example, the stored image data is image data that indicates a series of scenes in which a player character 54 dribbles forward near the sideline 52, and performs a cross pass, and then another player character 54 performs a header shot.

For example, the output data storage section 85 stores an image table for controlling output of the image data. FIG. 10 illustrates an example of the image table. As illustrated in FIG. 10, the image table contains "image ID", "image data", and "reference combination" fields. The "image ID" indicates identification information for uniquely identifying the image data. The "reference combination" is a reference combination that includes a plurality of line IDs. For example, in the image table illustrated in FIG. 10, image data having an image ID "0010" is associated with a reference combination of a line ID "100", a line ID "110", and a line ID "120". The line ID "100" is assigned to the line data that is output in the case where the player character 54 is dribbling forward near the sideline 52. The line ID "110" is assigned to the line data that is output in the case where the player character 54 has performed a cross pass (that is, in the case where a cross event has occurred). The line ID "120" is assigned to the line data that is output in the case where the player character 54 has performed a header (that is, in the case where a header event has occurred). The image data having the image ID "0010" is image data that indicates a series of scenes in which a player character 54 dribbles forward near the sideline 52, and performs a cross pass, and then another player character 54 performs a header.

[6-7. Judgment Section]

The judgment section 86 judges whether or not a combination of the situation identifying information received by the situation identifying information reception section 84 contains any reference combination. In this embodiment, the judgment section 86 judges whether or not a combination of line IDs received by the situation identifying information reception section 84 contains any reference combination of line IDs, which is held in the image table.

[6-8. Output Control Section]

The output control section 87 executes outputting of the situation of the game that is being executed in the game devices A and B based on the situation identifying information received by the situation identifying information reception section 84.

For example, the output control section 87 causes both or any one of the display unit 47 and the sound output unit 48 to output the line data corresponding to the line ID received by the situation identifying information reception section 84. The line data is displayed in the actual scene section 71 of the watching screen 70, and is also output from the sound output unit 48. It should be noted that in the case of outputting the line data, a player's name or the like may be output based on the player ID received by the situation identifying information reception section 84.

Further, for example, in the case where the combination of the situation identifying information received by the situation identifying information reception section 84 contains a reference combination, the output control section 87 causes both or any one of the display unit 47 and the sound output unit 48 to output the output data associated with the reference combination. In this embodiment, in the case where the combination of the line IDs received by the situation identifying information reception section 84 contains a reference combination, the output control section 87 displays the image data associated with the reference combination in the image section 72 of the watching screen 70.

[7. Processing to be Executed in Game System]

Figures 11, 12:
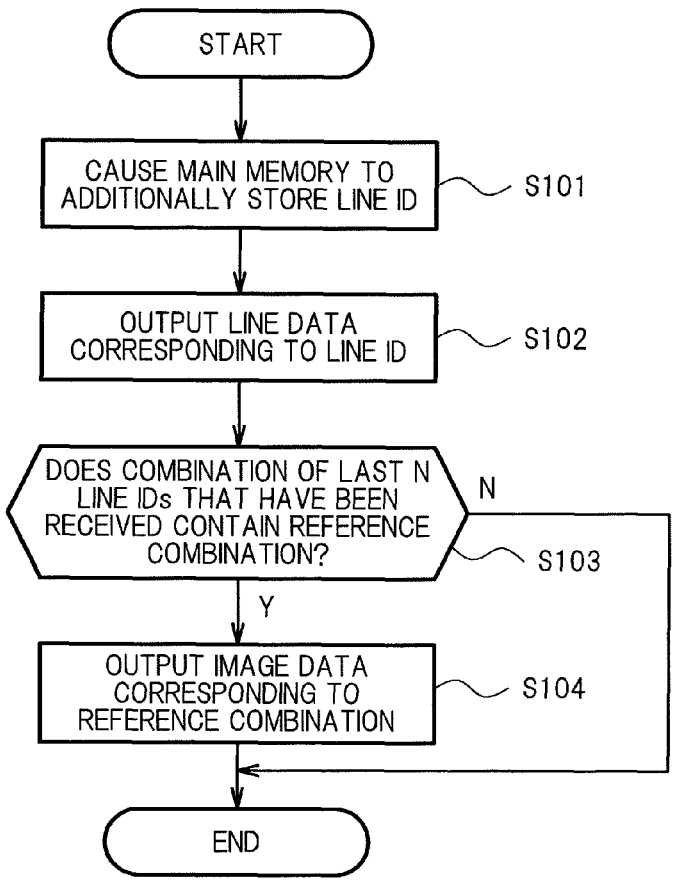
FIG. 11 is a flowchart illustrating processing to be executed by the output device.
FIG. 12 is a diagram illustrating another example of the image table.

Description is given of processing that is executed in the game system 10. FIG. 11 is a flow chart illustrating processing that is executed by the output device 40 in the case where the output device 40 has received a line ID. The control unit 41 of the output device 40 executes the processing illustrated in FIG. 11 in accordance with the program, thereby implementing the situation identifying information reception section 84, the judgment section 86, and the output control section 87.

As illustrated in FIG. 11, in the case where a line ID has been received, the control unit 41 (situation identifying information reception section 84) causes the main memory 42 to additionally store the line ID (S101). Further, the control unit 41 (output control section 87) outputs the line data corresponding to the received line ID (S102). Specifically, the line data corresponding to the received line ID is additionally displayed in the actual scene section 71 of the watching screen 70, and at the same time, the line data corresponding to the received line ID is output as sound. It should be noted that in the case of receiving a player ID along with the line ID, the player ID may be stored in association with the line ID. Further, the control unit 41 (output control section 87) may output the player's name or the like of the player character 54 corresponding to that player ID.

After that, the control unit 41 (judgment section 86) judges whether or not a combination of the last N (N≥2) line IDs that have been received contains any reference combination held in the image table (S103). For example, it is judged whether or not a combination of the last three line IDs that have been received contains any reference combination. Specifically, it is judged whether or not any reference combination is contained in the combination of the three line IDs, which are a line ID that has been received last, a line ID that has been received second last, and a line ID that has been received third last. If the combination of the last N line IDs that have been received contains a reference combination, the control unit 41 (output control section 87) reads out the image data corresponding to that reference combination, and then outputs the image data (S104). Specifically, the image data is displayed in the image section 72 of the watching screen 70.

[8. Summary]

With the game system 10 described above, through viewing the watching screen 70 or hearing the output sound, the user of the output device 40 can know the current situation of the soccer game that is being played by the users of a plurality of game devices 30, and can feel as if they are watching the soccer game as a spectator. Particularly, in the game system 10, the data to be transmitted to the output device 40 is line IDs which are data having a relatively small size, and hence it is possible to reduce a load on the communication network 12. Specifically, even in a case where the current situation of a soccer game is made available for a large number of output devices 40, it is possible to prevent the load on the communication network 12 from increasing.

Further, in the game system 10, the line IDs that are used by the game device 30 in executing a soccer game are also used as data (situation identifying information) for reporting the current situation of the soccer game to the output device 40. Accordingly, there is no need to separately store, on the game device 30 side, data for reporting the current situation of the soccer game to the output device 40. It is therefore possible to reduce the amount of data stored on the game device 30 side.

Further, in the output device 40, the image data corresponding to the combination of the situation identifying information (line IDs) is displayed in the image section 72 of the watching screen 70. This makes it easier for the user of the output device 40 to know the current situation of the soccer game. Here, in the game system 10, the image data itself is not transmitted to the output device 40 via the communication network 12, making it possible to reduce the load on the communication network 12.

[9. Modification Examples]

It should be noted that the present invention is not limited to the embodiment described above.

[9-1. First Modification Example]

For example, the image to be displayed in the image section 72 of the watching screen 70 may be changed based on parameters of the player character 54 corresponding to the player ID that has been received by the situation identifying information reception section 84. For example, in a case where an image of a header is displayed in the image section 72, the image of the header may be changed based on a header parameter indicating the heading ability of the player character 54 corresponding to the player ID that has been received by the situation identifying information reception section 84. For example, if the value of the header parameter is equal to or larger than a reference value, an image showing a powerful header may be displayed in the image section 72, whereas if the value of the header parameter is smaller than the reference value, an image showing a less powerful header may be displayed in the image section 72. Further, for example, in a case where an image of a shot performed with a foot is displayed in the image section 72, the image of the shot maybe changed based on a parameter indicating the dominant foot of the player character 54 corresponding to the player ID that has been received by the situation identifying information reception section 84. For example, if the player character 54 is right-footed, an image showing a scene in which a shot is performed with the right foot may be displayed in the image section 72, whereas if the player character 54 is left-footed, an image showing a scene in which a shot is performed with the left foot may be displayed in the image section 72. This configuration makes it easier for the user of the output device 40 to know the current situation of the soccer game.

In a first modification example, the output device 40 stores parameters of each of the player characters 54. Specifically, the output device 40 stores parameter data in association with the player ID. Further, the output data storage section 85 of the output device 40 stores the image data in association with the reference combination of line IDs and a parameter condition regarding the parameters of the player character 54. FIG. 12 illustrates an example of the image table for this case. As illustrated in FIG. 12, the image table for this case is added with a "parameter condition" field that indicates the parameter condition regarding the parameters of the player character 54. In FIG. 12, the image data having the image ID "0010" is the image data of a less powerful header, whereas the image data having an image ID "0011" is the image data of a powerful header.

In the case where the combination of the line IDs that have been received by the situation identifying information reception section 84 contains a reference combination, the output control section 87 of the output device 40 outputs, from among image data items associated with the reference combination, an image data item associated with a parameter condition that is satisfied by the parameter data associated with the player ID that has been received by the situation identifying information reception section 84.

It should be noted that the parameters of the player character 54 may be transmitted from the game device 30 to the output device 40. For example, the parameter data of all the player characters 54 belonging to the team A and the team B may be transmitted to the output device 40 at a predetermined time (for example, before the game starts). Alternatively, in the case where a player character 54 has performed a predetermined action (for example, header), the identification information (situation identifying information) corresponding to the action, the identification information corresponding to the player character 54, and the parameter indicating the ability to perform the action (for example, header) of the player character 54 may be transmitted to the output device 40. Still alternatively, in the case where a game event corresponding to an action itself of the player character 54 or a game event caused by an action of the player character 54 has occurred, the identification information (situation identifying information) corresponding to the game event, the identification information corresponding to the player character 54, and the parameter indicating the ability to perform the action of the player character 54 may be transmitted to the output device 40.

[9-2. Second Modification Example]

For example, the user of the output device 40 may be able to select one of the team A and the team B. Then, based on a selection result of the user, a limitation (for example, inhibition) may be imposed on transmission of the situation identifying information to the output device 40 of the user. For example, in the case where a user C of the output device 40 has selected the team A but has not selected the team B, the transmission may be performed as follows. The situation identifying information related to the situation of the team A selected by the user C is transmitted to the output device 40 of the user C, but the situation identifying information that is not related to the situation of the team A is not transmitted to the output device 40 of the user C.

In a second modification example, each of the output devices 40 prompts the user to select any one of the team A and the team B, and then receives the selection between the team A and the team B. The selection result of the user of each output device 40 is transmitted to the game management device 20, and then stored in the game management device 20. Further, the selection result of the user of each output device 40 is transmitted from the game management device 20 to the game device 30 which implements the situation identifying information transmission section 83. Specifically, the situation identifying information transmission section 83 acquires the selection result of the user of each output device 40 from the game management device 20, and then executes the transmission of the situation identifying information to the output device 40 based on the selection result of the user of the output device 40.

Here, description is given of an operation of the situation identifying information transmission section 83 of the second modification example. Hereinbelow, the description is given taking as an example a case in which the user C of the output device 40 has selected the team A but has not selected the team B.

For example, the situation identifying information transmission section 83 judges whether or not a player character 54 belonging to the team A has performed a predetermined action in the soccer game. Then, in the case where the player character 54 belonging to the team A has performed the predetermined action, the situation identifying information transmission section 83 transmits the identification information (situation identifying information) corresponding to the action to the output device 40 of the user C who has selected the team A. Moreover, in this case, the situation identifying information transmission section 83 also transmits the identification information corresponding to the player character 54 who has performed the action to the output device 40 of the user C. On the other hand, in the case where a player character 54 belonging to the team B has performed a predetermined action, the situation identifying information transmission section 83 does not transmit the identification information corresponding to the action to the output device 40 of the user C who has not selected the team B. With this configuration, for example, in the case where a player character 54 belonging to the team A has performed a dribbling action, the identification information (situation identifying information) corresponding to the dribbling action is transmitted to the output device 40 of the user C. In the case where a player character 54 belonging to the team B has performed a dribbling action, the identification information (situation identifying information) corresponding to the dribbling action is not transmitted to the output device 40 of the user C.

Further, for example, the situation identifying information transmission section 83 judges whether or not a predetermined game event related to the team A has occurred in the soccer game. Here, the predetermined game event related to the team A includes, for example, a game event corresponding to an action itself performed by a player character 54 belonging to the team A and a game event that occurs as the result of an action performed by a player character 54 belonging to the team A. In addition, the game event related to the team A also includes, for example, a scoring event that corresponds to a case in which the team A has scored a goal, a scored event that corresponds to a case in which the team A has conceded a goal, an injury event that corresponds to a case in which a player character 54 belonging to the team A has become injured, and other events.

In the case where the given game event related to the team A has occurred, the situation identifying information transmission section 83 transmits the identification information (situation identifying information) corresponding to the game event to the output device 40 of the user C who has selected the team A. Here, in a case where a player character 54 has caused the game event to occur, the situation identifying information transmission section 83 also transmits, to the output device 40 of the user C, the identification information corresponding to the player character 54 who has caused the game event to occur. On the other hand, in the case where a predetermined game event that is not related to the team A has occurred, the situation identifying information transmission section 83 does not transmit the identification information corresponding to the game event to the output device 40 of the user C who has not selected any other team than the team A.

According to the second modification example, the situation identifying information related to the situation of the team selected by the user of the output device 40 is transmitted to that output device 40. There is a case where the user of the output device 40 wants to know only the current situation of the team that the user themselves are cheering for, but does not want to know the current situation of the team that the user themselves are not cheering for. In this respect, according to the second modification example, by selecting a team that the user themselves are cheering for, the user of the output device 40 can know only the current situation of the team that the user is cheering for. Moreover, according to the second modification example, the situation identifying information that is not related to the situation of the team that has been selected by the user is not transmitted to the output device 40 of the user, and hence the load on the communication network 12 can be reduced.

It should be noted that in the second modification example, instead of selecting a team, the user of the output device 40 may be able to select at least one player character 54. For example, in a case where the user C of the output device 40 has selected one player character 54 (hereinbelow, referred to as "player character X"), but has not selected the other player characters 54, the transmission may be performed as follows.

The situation identifying information related to the situation of the player character X selected by the user C is transmitted to the output device 40 of the user C, but the situation identifying information that is not related to the situation of the player character X is not transmitted to the output device 40 of the user C. With this configuration, by selecting their favorite player character 54, the user of the output device 40 can know only the current situation of their favorite player character 54. Further, according to the second modification example, the situation identifying information that is not related to the situation of the player character 54 selected by the user is not transmitted to the output device 40 of the user, and hence the load on the communication network 12 can be reduced.

[9-3. Third Modification Example]

For example, the situation identifying information transmission section 83 may be implemented by the game management device 20 (control unit 21). Specifically, in a case where any one of the game devices 30 (for example, game device 30 serving as the game server) outputs the line data, the line ID of that line data may be transmitted to the game management device 20. Then, the game management device 20 may distribute the line ID received from the game device 30 to a plurality of the output devices 40.

[9-4. Other Modification Examples]

For example, the game management device 20 may serve as the game server. Alternatively, a server computer other than the game management device 20 may serve as the game server. In such cases, the functions described as to be implemented by the game device 30 serving as the game server may be implemented by the game management device 20 or the server computer.

Further, for example, the game space shared among the plurality of game devices 30 may be a two-dimensional space in which the positions and the like of the player characters 54 and ball 55 are managed with two coordinate elements.

Further, for example, the game to be provided in the game system 10 may be a game other than a soccer game (for example, another sports game, a fighting game, or a racing game). Further, for example, the game to be provided in the game system 10 may be a game like a soccer game, in which game character groups (for example, teams) compete against each other, may be a game in which one game character competes against another game character, or may be a game in which one game character competes against a game character group. Further, for example, the game to be provided in the game system 10 may be a game in which three or more users participate. Further, for example, the game to be provided in the game system 10 may be a game that is played by a plurality of users in a cooperating manner. Further, for example, the game to be provided in the game system 10 may be a game that is played by a single user.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game system, comprising:
   at least one game device which executes a game played by a user; and
   an output device which is different from the at least one game device,
   the at least one game device comprising:
   a display;
   a first processor; and
   at least one first memory device which stores a plurality of instruction, which when executed by the first processor, cause the first processor to:
   control a position or a line of sight of a virtual camera in a virtual game environment based on game situation data comprising data indicating a state of a virtual game character;
   display, on the display, a game screen showing the virtual game environment viewed from the virtual camera;
   determine whether the virtual game character performs an action in the virtual game environment based on the same situation data;
   retrieve a situation identifying information related the action performed by the virtual game character in the virtual game environment; and
   transmit, to the output device, the situation identifying information, and
   the output device comprising:
   a second processor;
   an output data storage, which pre-stores a plurality of text data and a plurality of still image data in association with a plurality of identifiers, the plurality of text data and the plurality of still image data specifying respective game situations; and
   at least one second memory device which stores a plurality of instruction, which
   when executed by the second processor, cause the second processor to:
   receive the situation identifying information from the at least one game device, the situation identifying information including an identifier, among the plurality of identifiers; and
   access, after receiving the identifier, the output data storage of the output device using the identifier as an index, retrieve one of the plurality of text data or one of the still image data that is pre-stored in association with the received identifier, and display the text data or the still image data on a display screen of the output device.

2. A game system according to claim 1, wherein:
   the output device comprises:
   the output data storage which further stores output data in association with a reference combination of the situation identifying information; and
   the plurality of instruction stored in the at least one second memory device of the output device causes the second processor to judge whether or not a combination of the received situation identifying information contains the reference combination; and
   if the combination of the received situation identifying information contains the reference combination, the plurality of instruction stored in the at least one second memory device of the output device causes the second processor to output the output data associated with the reference combination.

3. A game system according to claim 2, wherein:
   the plurality of instruction stored in the at least one first memory device of the at least one game device causes the first processor to transmit to the output device, as the situation identifying information, first identification information corresponding to the action, and also transmit to the output device, second identification information corresponding to the game character;
   the output data storage stores the output data in association with a reference combination of the first identification information and a parameter condition regarding a parameter of the game character;

the plurality of instruction stored in the at least one second memory device of the output device causes the second processor to judge whether or not a combination of the received first identification information contains the reference combination; and if the combination of the received first identification information contains the reference combination, the plurality of instruction stored in the at least one second memory device of the output device causes the second processor to output the output data associated with the reference combination and the parameter condition that is satisfied by the parameter of the game character corresponding to the received second identification information.

4. A game system according to claim 2, wherein:
the plurality of instruction stored in the at least one first memory device of the at least one game device causes the first processor to:

determine whether a game event has occurred in the virtual game environment as a result of the action performed by the virtual game character;

retrieve first situation identifying information corresponding to the game even that has occurred in the virtual game environment; and transmit, as the situation identifying information, the first identification information, to the output device and also transmits second identification information corresponding to the virtual game character;

the output data storage stores the output data in association with a reference combination of the first identification information and a parameter condition regarding a parameter of the virtual game character;

the plurality of instruction stored in the at least one second memory device of the output device causes the second processor to judge whether or not a combination of the received first identification information contains the reference combination; and if the combination of the received first identification information contains the reference combination, the plurality of instruction stored in the at least one second memory device of the output device causes the second processor to output the output data associated with the reference combination and the parameter condition that is satisfied by the parameter of the game character corresponding to the received second identification information.

5. The game system of claim 2, wherein the reference combination includes a combination of a plurality of situation identifying information.

6. The game system of claim 5, wherein the reference combination includes a combination of a plurality of situation identifying information received in series.

7. A game system according to claim 1, wherein:
the plurality of instruction stored in the at least one first memory device of the at least one game device causes the first processor to acquire a selection result obtained in the case where a user corresponding to the output device has selected one of at least one game character and at least one game character group; and the plurality of instruction stored in the at least one first memory device of the at least one game device causes the first processor to transmit, to the output device, the situation identifying information related to a situation of the one of the at least one game character and the at least one game character group, which has been selected by the user corresponding to the output device.

8. The game system of claim 1, wherein the output device uses the situation identifying information as the index to a table storing the output data in the storage.

9. The game system of claim 1, wherein:
the at least one game device displays the game screen using a processing for generating an image showing the virtual game environment viewed from the virtual camera, and the output device outputs the text data or the still image data without using the processing for generating the image showing the virtual game environment viewed from the virtual camera.

10. A control method for a game system, the game system including at least one game device; and an output device including a storage, the control method comprising:

controlling a position or a line of sight of a virtual camera in a virtual game environment based on game situation data comprising data indicating a state of a virtual game character;

displaying, on a display, a game screen showing the virtual game environment viewed from the virtual camera;

determining whether the virtual game character performs an action in a virtual game environment based on the game situation data;

retrieving a situation identifying information related the action performed by the virtual game character in the virtual game environment; and transmitting, to the output device which is different from the at least one game device, the situation identifying information;

receiving, by the output device, the situation identifying information;

accessing, by the output device, after receiving the situation identifying information, the storage of the output device that pre-stores a plurality of text data and a plurality of still image data in association with a plurality of identifiers, the plurality of text data and the plurality of still image data specifying respective game situations, and the situation identifying information including an identifier, among the plurality of identifiers;

retrieving, by the output device, one of the plurality of textual data or one of the still image data that is pre-stored in association with the received identifier; and controlling, by one or more processors, the output device to display the textual data or the still image data on a display screen of the output device.

11. The method of claim 10, wherein the output device uses the situation identifying information as the index to a table storing the output data in the storage.

12. An output device, comprising:
a processor;
an output data storage, which pre-stores a plurality of text data and a plurality of still image data in association with a plurality of identifiers, the plurality of text data and the plurality of still image data specifying respective game situations; and at least one memory device which stores a plurality of instruction, which when executed by the processor, cause the processor to:
receive situation identifying information related to an action performed by a virtual game character in a virtual game environment executed in at least one game device from the at least one game device, the situation identifying information including an identifier, among the plurality of identifiers, and whether the action is performed by the virtual game character in the virtual game environment being, determined based on a game situation data used for controlling a position or a line of sight of a virtual camera in the virtual game environment; and access, after receiving the identifier, the output data storage of the output device using the identifier as an index, retrieve one of the plurality of textual data or one of the still data that is pre-stored in association with the received identifier, and display the textual data or the still image data on a display screen of the output device, wherein the output device is different from the at least one game device.

13. The output device of claim 12, wherein the output device uses the situation identifying information as the index to a table storing the output data in the storage.

14. A control method for an output device include a storage, comprising:

receiving, by the output device, situation identifying information related to an action performed by a virtual game character in a virtual game environment that is executed in at least one game device, and whether the action is performed by the virtual game character in the virtual game environment being determined based on a game situation data used for controlling a position or a line of sight of a virtual camera in the virtual game environment;

accessing, by the output device, after receiving the situation identifying information, the storage of the output device that pre-stores a plurality of text data and a plurality of still image data in association with a plurality of identifiers, the plurality of text data and the plurality of still image data specifying respective game situations, and the situation identifying information including an identifier, among the plurality of identifiers;

retrieving, by one or more processors, one of the plurality of textual data or one of the still image data that is pre-stored in association with the received identifier; and displaying the textual data or the still image data on a display screen of the output device, wherein the output device is different from the at least one game device, wherein when a game character has performed an action in the game, identification information corresponding to the action is received by the output device as the situation identifying information.

15. The method of claim 14, wherein the output device uses the situation identifying information as the index to a table storing the output data in the storage.

16. A non-transitory computer-readable information storage medium recorded having stored thereon a program with instructions for performing a control method when the program is executed on a computer, the method comprising:

receiving, by an output device comprising a storage, situation identifying information related to an action performed by a virtual game character in a virtual game environment that is executed in at least one game device, and whether the action is performed by the virtual game character in the virtual game environment being determined based on a game situation data used for controlling a position or a line of sight of a virtual camera in the virtual game environment;

accessing, by the output device, after receiving the situation identifying information, the storage of the output device that pre-stores a plurality of text data and a plurality of still image data in association with a plurality of identifiers, the plurality of text data and the plurality of still image data specifying respective game situations, and the situation identifying information including an identifier, among the plurality of identifiers;

retrieving, by the output device, one of the plurality of textual data or one of the still image data that is pre-stored in association with the received identifier and displaying the textual data or the still image data on a display screen of the output device, wherein the output device is different from the at least one game device, wherein when a game character has performed an action in the game, identification information corresponding to the action is received by the output device as the situation identifying information.

17. The non-transitory computer-readable information storage medium of claim 16, wherein the output device uses the situation identifying information as the index to a table storing the output data in the storage.

18. A game system, comprising:

at least one game device which executes a game played by a user;

at least one game management device which is different from the at least one game device, and an output device which is different from the at least one game device, the game management device comprising:

a first processor; and at least one first memory device which stores a plurality of instruction, which when executed by the first processor, cause the first processor to:

control a position or a line of sight of a virtual camera in a virtual game environment based on game situation data comprising data indicating a state of a virtual game character;

display, on the display, a game screen showing the virtual game environment viewed from the virtual camera;

determine whether the virtual game character performs an action in the virtual game environment based on the game situation data;

retrieve a situation identifying information related the action performed by the virtual game character in the virtual same environment; and transmit, to the output device, the situation identifying information, and the output device comprising:

a second processor;

an output data storage, which pre-stores a plurality of text data and a plurality of still image data in association with a plurality of identifiers, the plurality of text data and the plurality of still image data specifying respective game situations; and at least one second memory device which stores a plurality of instruction, which when executed by the second processor, cause the second processor to:

receive the situation identifying information from the at least one game device, the situation identifying information including an identifier, among the plurality of identifiers; and access, after receiving the identifier, the output data storage of the output device using the identifier as an index, retrieve one of the plurality of text data or one of the still image data that is pre-stored in association with the received identifier and display the text data or the still image data on a display screen of the output device.

* * * * *